US012791998B2

(12) United States Patent
Yakushiji et al.

(10) Patent No.: US 12,791,998 B2
(45) Date of Patent: Nov. 10, 2026

(54) PLANT CONTROL DEVICE AND METHOD FOR RENEWING CONTROL IO MODULE IN PLANT CONTROL DEVICE

(71) Applicant: MITSUBISHI HEAVY INDUSTRIES, LTD., Tokyo (JP)

(72) Inventors: Yuichi Yakushiji, Yokohama (JP); Shinichi Yamawaki, Yokohama (JP); Yusuke Oobu, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 547 days.

(21) Appl. No.: 18/280,524

(22) PCT Filed: Mar. 10, 2022

(86) PCT No.: PCT/JP2022/010590
§ 371 (c)(1),
(2) Date: Sep. 6, 2023

(87) PCT Pub. No.: WO2022/191284
PCT Pub. Date: Sep. 15, 2022

(65) Prior Publication Data

US 2024/0142934 A1 May 2, 2024

(30) Foreign Application Priority Data

Mar. 12, 2021 (JP) ................................ 2021-040478

(51) Int. Cl.
*G05B 19/05* (2006.01)
*H01R 31/06* (2006.01)

(52) U.S. Cl.
CPC .......... *G05B 19/054* (2013.01); *H01R 31/06* (2013.01)

(58) Field of Classification Search
CPC ...... G05B 19/054; G05B 19/05; H01R 31/06; Y02P 90/02
See application file for complete search history.

(56) References Cited

U.S. PATENT DOCUMENTS

| | | | | |
|---|---|---|---|---|
| 7,109,833 B1 * | 9/2006 | Pohl | ..................... | H01H 50/047 361/636 |
| 2004/0087215 A1 * | 5/2004 | Pohl | ..................... | H01R 9/2408 439/638 |
| 2020/0127411 A1 | 4/2020 | Pakimo et al. | | |

FOREIGN PATENT DOCUMENTS

| | | |
|---|---|---|
| EP | 0591657 A1 | 4/1994 |
| JP | H06-163129 A | 6/1994 |

(Continued)

OTHER PUBLICATIONS

Machine translation JP-2007241633-A, (dated Sep. 20, 2007) (Year: 2026).*

(Continued)

*Primary Examiner* — Travis S Chambers
(74) *Attorney, Agent, or Firm* — WHDA, LLP

(57) ABSTRACT

A plant control device includes: a terminal base where a wiring is connected which is connected to each of multiple devices installed in a plant; a control IO module where an IO signal is input or the IO signal is output; and a terminal base adapter disposed between the control IO module and the terminal base, the terminal base adapter being configured to convert, by a predetermined logic, an IO signal input from at least one of the multiple devices or the IO signal input from the control IO module. The terminal base adapter is mountable on the terminal base and includes a second electrical connector which is mounted with a first electrical connector disposed on the control IO module.

6 Claims, 12 Drawing Sheets

(56) References Cited

FOREIGN PATENT DOCUMENTS

| | | | | |
|---|---|---|---|---|
| JP | 2002-352784 | A | | 12/2002 |
| JP | 2003-282205 | A | | 10/2003 |
| JP | 2004-038743 | A | | 2/2004 |
| JP | 2007-018503 | A | | 1/2007 |
| JP | 2007-172371 | A | | 7/2007 |
| JP | 2007241633 | A | * | 9/2007 |
| JP | 2010-259137 | A | | 11/2010 |
| JP | 2014-106952 | A | | 6/2014 |
| JP | 2014-146078 | A | | 8/2014 |
| JP | 2015-008197 | A | | 1/2015 |
| JP | 2017-022946 | A | | 1/2017 |
| JP | 2017-163770 | A | | 9/2017 |
| JP | 2020-022230 | A | | 2/2020 |
| KR | 10-1515987 | B1 | | 5/2015 |

OTHER PUBLICATIONS

International Search Report dated May 10, 2022, issued in counterpart application of PCT/JP2022/010590. (11 pages).

Notification Concerning Transmittal of International Preliminary Report on Patentability (Forms PCT/IB/326) issued in counterpart International Application No. PCT/JP2022/010590 mailed Sep. 21, 2023, with Forms PCT/IB/373 and PCT/ISA/237, with English Translation. (14 pages).

Office Action dated Jun. 29, 2021, issued in counterpart JP application No. 2021-040478, with English Translation. (6 pages).

The Decision of Refusal dated Nov. 16, 2021, issued in counterpart JP application No. 2021-040478, with English Translation. (7 pages).

* cited by examiner

PLANT CONTROL DEVICE AND METHOD FOR RENEWING CONTROL IO MODULE IN PLANT CONTROL DEVICE

TECHNICAL FIELD

The present disclosure relates to a plant control device and a method for renewing a control IO module in the plant control device.

This application claims the priority of Japanese Patent Application No. 2021-040478 filed on Mar. 12, 2021, the content of which is incorporated herein by reference.

BACKGROUND

Conventionally, renewal work for a control IO module is performed by procedures of stopping power supply in a control panel, checking a label of an existing field wiring cable in the control panel, disconnecting the existing field wiring cable in the control panel from a terminal base, safely protecting a terminal section of the disconnected cable, removing an existing control IO module from the terminal base, removing a control terminal base from the control panel, executing modification work of a control panel structure for a renewal control device or installing a new control panel, installing a renewal control terminal base, installing a renewal new control IO module, connecting the existing field wiring cable to the renewal control terminal base, checking the label of the existing field wiring cable, an IO signal, adding, checking a wiring for a renewal additional IO signal, turning on power in the control panel.

Patent Document 1 discloses a control panel that includes a base body formed with an opening on a front side, a door disposed to be openable and closable with respect to the front opening of the base body, a relay unit disposed in an interior space of the base body on a far side of the base body from the door and electrically connected to a control object; and an 10 unit disposed in the interior space of the base body on the far side of the base body from the door and on a near side of the base body from the relay unit and electrically connected to the relay unit.

In the control panel of Patent Document 1, the relay unit and a new IO unit are integrated as a new IO adapter housing renewal unit to replace an existing IO unit.

The new IO adapter housing renewal unit is supported on an upper portion of a pair of central pillars disposed in an interior space of a box on the far side of the base body from the door, and the new IO unit is supported on a front panel of the new IO adapter housing renewal unit. The new IO unit and the relay unit are electrically connected by an in-panel IO cable, and wire connection of the in-panel IO cable is performed in consideration of a difference in pin assignment between the new IO unit and the existing IO unit.

Further, an existing external cable is electrically connected at one side to the control target and connected at another side to an existing external line connector, and the existing external line connector is removed from the existing IO unit and attached to the front side of the relay unit when the new IO adapter housing renewal unit is replaced with the existing IO unit.

CITATION LIST

Patent Literature

Patent Document 1: JP2017-163770A

SUMMARY

Technical Problem

In the conventional renewal work for the control IO module, the field wiring cable is disconnected from the existing control terminal base, and then the existing control terminal base is removed from the control panel, the renewal new control terminal base is newly installed on the control panel, and the field wiring cable is reconnected to the new control terminal base, taking a lot of time to disconnect these field wiring cables from the existing control terminal base or to reconnect these field wiring cables to the new control terminal base. Also, it is necessary to perform the work particularly carefully in order to prevent incorrect connection of the field wiring cables.

In the control panel disclosed in Patent Document 1, the existing external line connector receives the weight of the existing external line cable, which causes the existing external line connector (existing external line cable (wiring)) to come off from the relay unit, and the IO unit (control IO module) may not function stably. Further, it is necessary to install a pair of center pillars on the base body in order to support the new IO adapter housing renewal unit. Furthermore, the relay unit and the new IO unit are electrically connected by using the in-panel IO cable, and wire connection of thereof needs to carefully performed in consideration of the difference in pin assignment between the new IO unit and the existing IO unit.

The present disclosure has been made in view of the above-described problems, and an object of the present disclosure is to provide a plant control device in which the control IO module functions stably and a method for renewing the control IO module in the plant control device.

Solution to Problem

In order to achieve the above object, a plant control device according to the present disclosure, includes: a terminal base where a wiring is connected which is connected to each of multiple devices installed in a plant; a control IO module where an IO signal is input or the IO signal is output; and a terminal base adapter disposed between the control IO module and the terminal base, the terminal base adapter being configured to convert, by a predetermined logic, an IO signal input from at least one of the multiple devices or the IO signal input from the control IO module. The terminal base adapter is mountable on the terminal base and includes a second electrical connector which is mounted with a first electrical connector disposed on the control IO module.

In order to achieve the above object, a method for renewing a control IO module in a plant control device, includes: a step of removing an existing control IO module from a terminal base where a wiring is connected which is connected to each of multiple devices installed in a plant; a step of mounting, on the terminal base, a terminal base adapter in place of the existing control IO module; and a step of mounting anew control IO module on the terminal base adapter.

Advantageous Effects

With a plant control device of the present disclosure, since the wiring connected to each of multiple devices installed in a plant is connected to a terminal base and a terminal base adapter is mounted on the terminal base, the terminal base receives the weight of the wiring and the control IO module mounted on the terminal base adapter functions stably.

With the method for renewing the control IO module in the plant control device of the present disclosure, since the terminal base adapter is mounted on the terminal base adapter while maintaining the state where the wiring connected to each of the multiple devices installed in the plant is connected to the existing terminal base, the terminal base receives the weight of the wiring and the new control IO module mounted on the terminal base adapter functions stably.

Further, since the existing control IO module can be renewed with the new control IO module without disconnecting the wiring connected to each of the multiple devices from the existing terminal base, it is possible to suppress the possibility of incorrect connection associated with reconnection work and to shorten the construction period of the renewal work. Furthermore, since the renewal work for the control IO module is performed by using the existing terminal base as it is, it is possible to minimize the scope of work such as structural change of a control panel.

DETAILED DESCRIPTION

Figure 1:
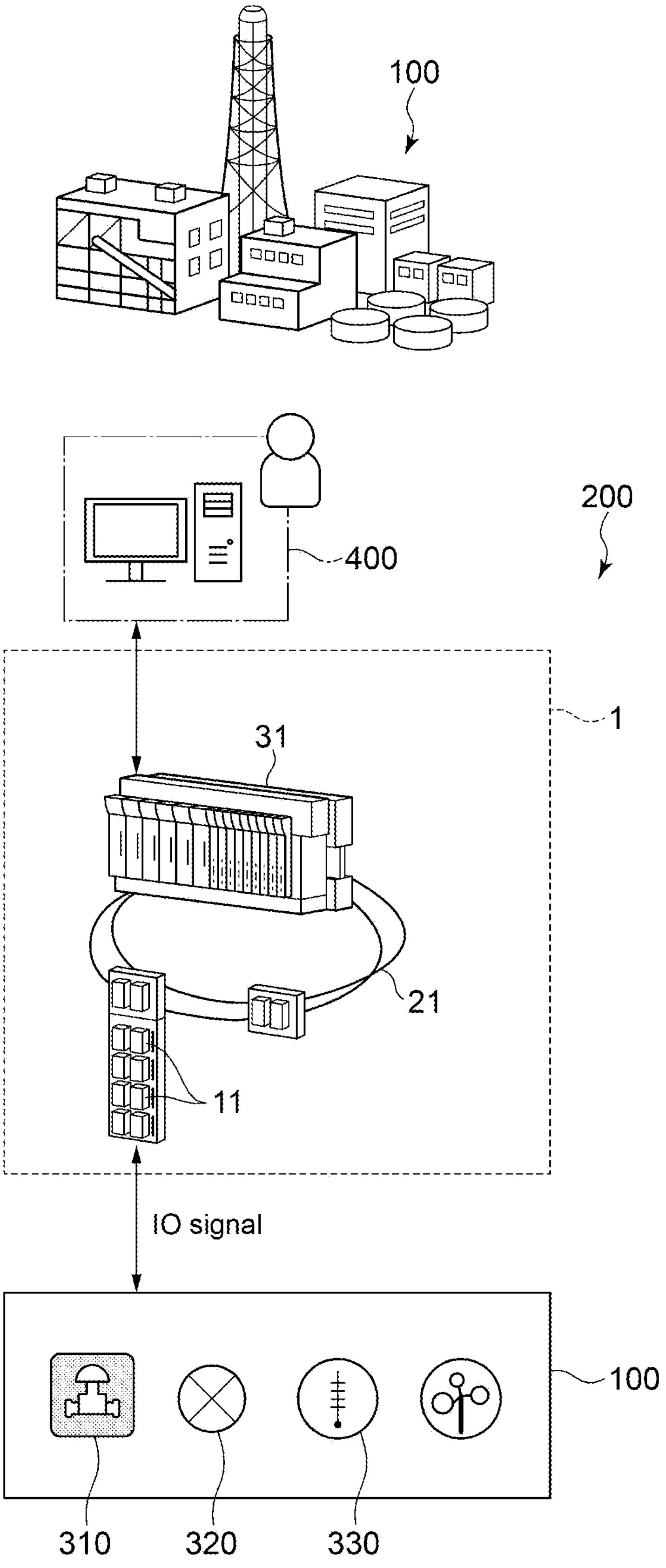
FIG. 1 is a configuration diagram schematically showing a plant and a control system for the plant according to an embodiment.

A plant control device and a method for renewing a control IO module in the plant control device according to an embodiment will be described below with reference to the accompanying drawings. It is intended, however, that unless particularly specified, dimensions, materials, shapes, relative positions and the like of components described in the embodiment or shown in the drawings shall be interpreted as illustrative only and not intended to limit the scope of the present invention.

FIG. 1 is a configuration diagram schematically showing a plant 100 and a control system 200 for the plant 100 according to an embodiment.

As shown in FIG. 1, the plant 100 according to the embodiment is a plant such as a power generation plant, and the control system 200 for the plant 100 according to the embodiment includes multiple devices 310, 320, 330 . . . installed in the plant 100, a plant control device 1, and an operation terminal 400. The multiple devices 310, 320, 330 . . . installed in the plant 100 are, for example, the valve 310, the transmitter 320, the sensor 330, etc., and the plant control device 1 includes multiple control IO modules 11, a network 21, and a high-speed arithmetic controller 31 (DCS (Distributed Control System)).

Figure 2:
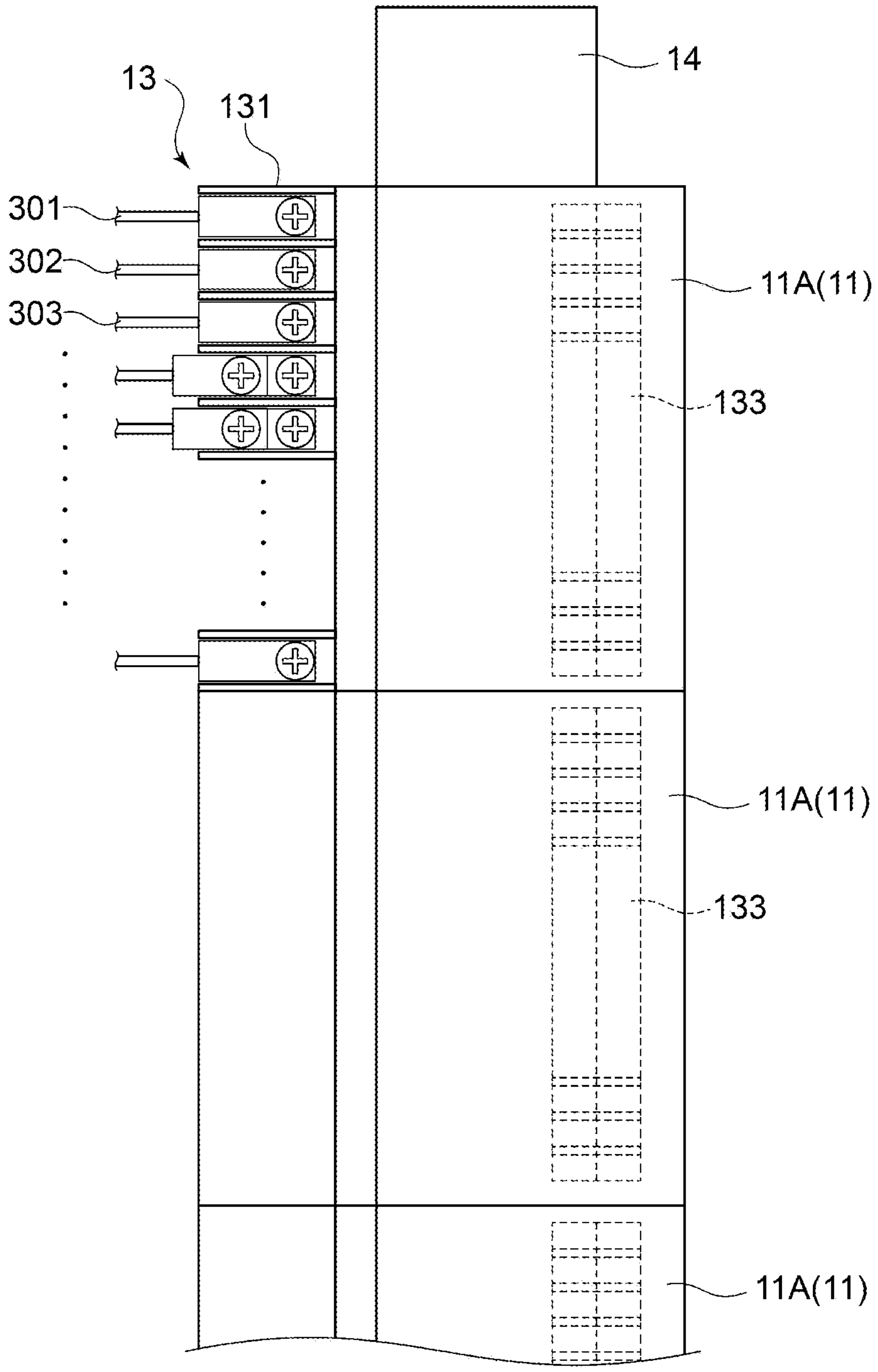
FIG. 2 is a view schematically showing a terminal base attached to a base body installed in an interior front of a housing, the view showing a state in which an existing control IO module is mounted.
Figure 3:
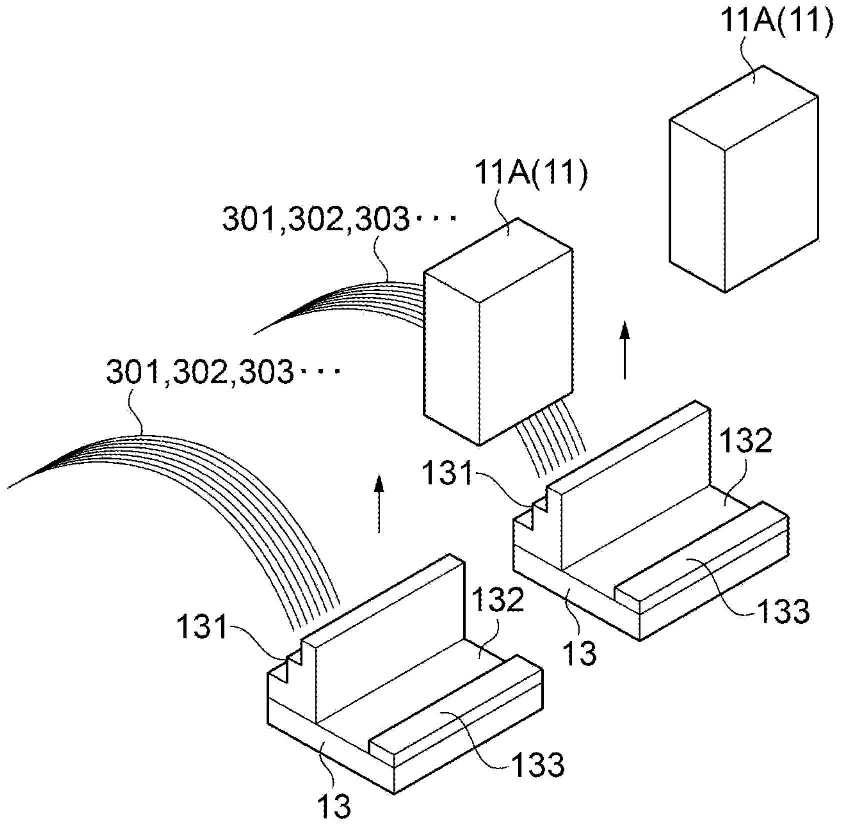
FIG. 3 is a perspective view schematically showing the terminal base shown in FIG. 2, the view showing a state in which the existing control IO module is removed from the terminal base.

FIG. 2 is a view schematically showing a terminal base 13 attached to a base body installed in an interior front of a housing, the view showing a state in which an existing control IO module 11A is mounted on the terminal base 13. FIG. 3 is a perspective view schematically showing the terminal base 13 shown in FIG. 2, the view showing a state in which the existing control IO module 11A is removed from the terminal base 13.

The multiple control IO modules 11 are installed inside the housing with an open front surface and are closed by a door for closing the opening of the housing, for example.

As shown in FIG. 2, the multiple control IO modules 11 are installed on a base body disposed in the interior front of the housing, by the terminal base 13 or a terminal base adapter (see FIG. 6) mounted on the terminal base 13.

The terminal base 13 is installed via a DIN rail 14 on the base body disposed in the interior front of the housing, for example. Wirings 301, 302, 303 . . . which are connected to the multiple devices 310, 320, 330 . . . installed in the plant 100 are connected to the terminal base 13 through holes disposed in the housing. The multiple devices 310, 320, 330 . . . installed in the plant 100 are, for example, the valve 310, the transmitter 320, the sensor 330, etc. as described above, and these are referred to as field devices.

As shown in FIG. 3, the terminal base 13 includes a terminal section 131 to which the wirings 301, 302, 303 . . . connected to the multiple devices 310, 320, 330 . . . installed in the plant 100 are connected, and a mount section 132 on which the existing control IO module 11A is mounted. For example, the terminal section 131 is composed of a two-stage terminal base in which terminals are arranged on respective two stepped portions disposed in a stepped manner, and is connected in a state where the wirings 301, 302, 303 . . . (the multiple wirings 301, 302, 303 . . . ) connected to the multiple devices 310, 320, 330 . . . installed in the plant 100 are consolidated. An electrical connector 133 is disposed on the mount section 132 of the terminal base 13 and is electrically connected to the terminal disposed on the terminal section 131. The electrical connector 133 disposed on the mount section 132 is mounted with an electrical connector (not shown) disposed in the existing control IO module 11A.

The existing control IO module 11A is a control module where an IO signal is input or the IO signal is output, and is classified into, for example, a control IO module capable of analog input, a control IO module capable of analog output, a control IO module capable of digital input, and a control IO module capable of digital output. The IO signal from each of the multiple devices 310, 320, 330 . . . installed in the plant 100 is input via the terminal base 13 to the existing control IO module 11A, or the IO signal is output via the terminal base 13 to each of the multiple devices 310, 320, 330 . . . installed in the plant 100.

As with the existing control IO module 11A, anew control IO module 11B (see FIG. 6) is a control module where the IO signal is input or the IO signal is output, and is classified into, for example, the control IO module capable of analog input, the control IO module capable of analog output, the control IO module capable of digital input, and the control IO module capable of digital output. The IO signal input via the terminal base 13 is converted by the terminal base adapter 15 and is input to the new control IO module 11B, and the IO signal output from the new control IO module 11B is converted by the terminal base adapter 15 and is output via the terminal base 13.

Figure 4:
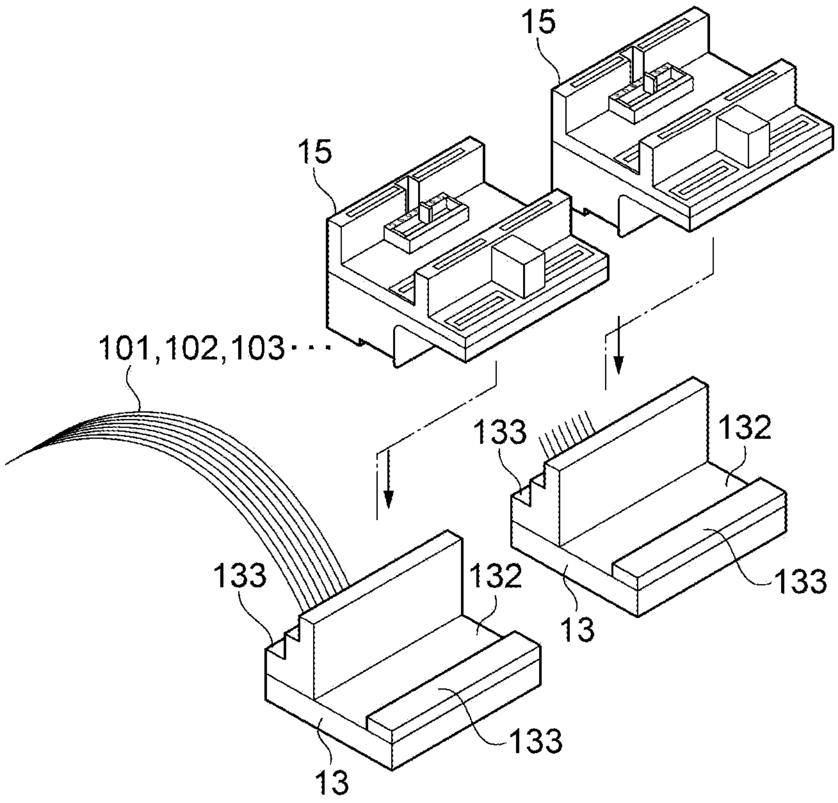
FIG. 4 is a perspective view schematically showing the terminal base shown in FIG. 2 and a terminal base adapter to be mounted on the terminal base.
Figure 5:
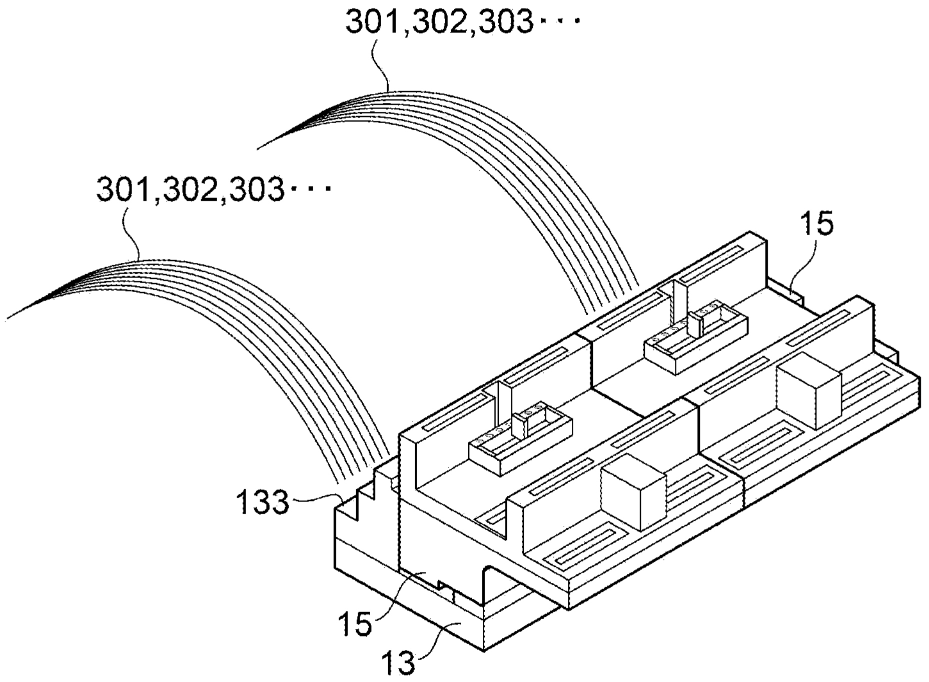
FIG. 5 is a perspective view schematically showing the terminal base shown in FIG. 2 and the terminal base adapter mounted on the terminal base.

FIG. 4 is a perspective view schematically showing the terminal base 13 shown in FIG. 2 and the terminal base adapter 15 to be mounted on the terminal base 13, and FIG. 5 is a perspective view schematically showing the terminal base 13 shown in FIG. 2 and the terminal base adapter 15 mounted on the terminal base 13.

The terminal base adapter 15 is disposed between the new control IO module 11B (see FIG. 6) and the terminal base 13, and is configured to convert, by a predetermined logic, the IO signal input from at least one of the multiple devices 310, 320, 330 . . . installed in the plant 100 or the IO signal input from the new control IO module 11B. As shown in FIG. 4, in place of the existing control IO module 11A mounted on the mount section 132 of the terminal base 13, the terminal base adapter 15 can be mounted on the mount section 132 of the terminal base 13, and is provided with an electrical connector (not shown) to be mounted on the electrical connector 133 at a position facing the electrical connector 133 disposed on the mount section 132 of the terminal base 13. Thus, as shown in FIG. 5, if, in place of the existing control IO module 11A mounted on the mount section 132 of the terminal base 13, the terminal base adapter 15 is mounted on the mount section 132 of the terminal base 13, the electrical connector disposed on the terminal base adapter 15 is mounted on the electrical connector 133 disposed on the mount section 132 of the terminal base 13, the IO signal output from each of the multiple devices 310, 320, 330 . . . installed in the plant 100 is input via the terminal base 13 to the terminal base adapter 15, and the IO signal output from the new control IO module 11A and converted by the terminal base adapter 15 is output via the terminal base 13 to each of the multiple devices 310, 320, 330 . . . installed in the plant 100.

Figure 6:
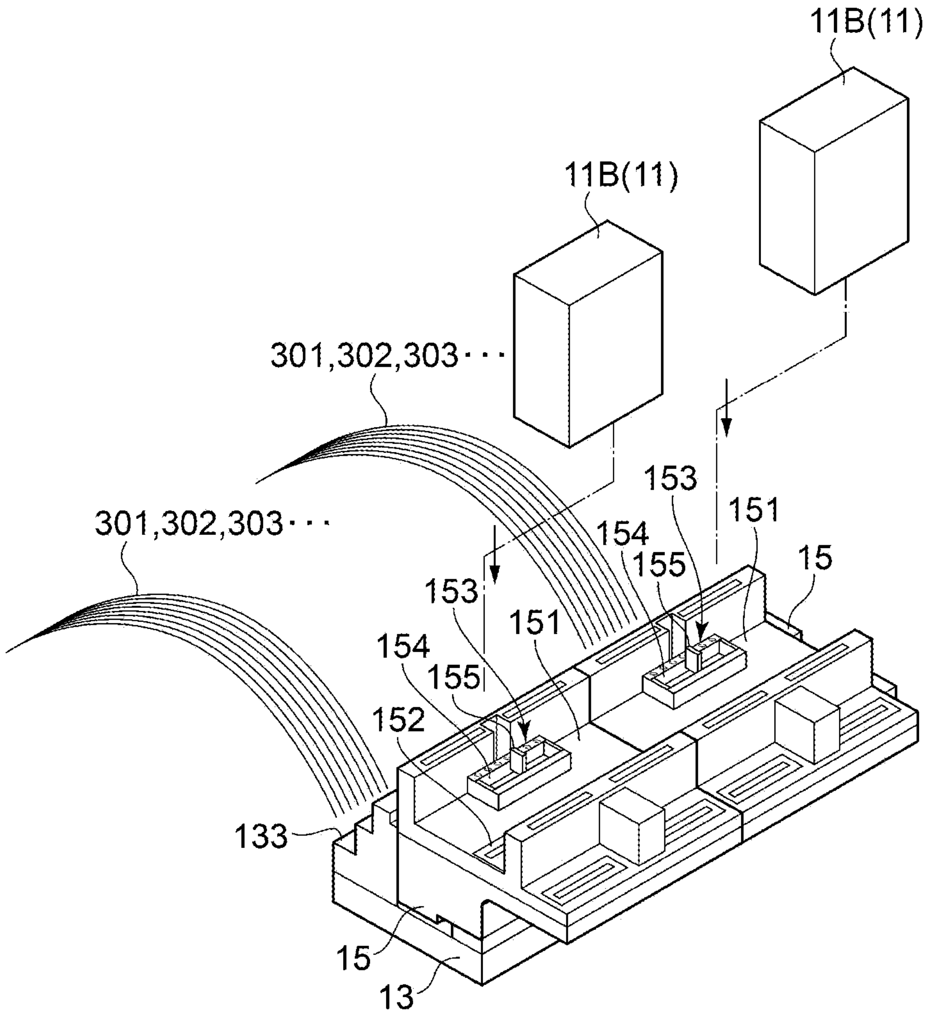
FIG. 6 is a perspective view schematically showing the terminal base adapter shown in FIG. 5 and a new control IO module to be mounted on the terminal base adapter.
Figure 7:
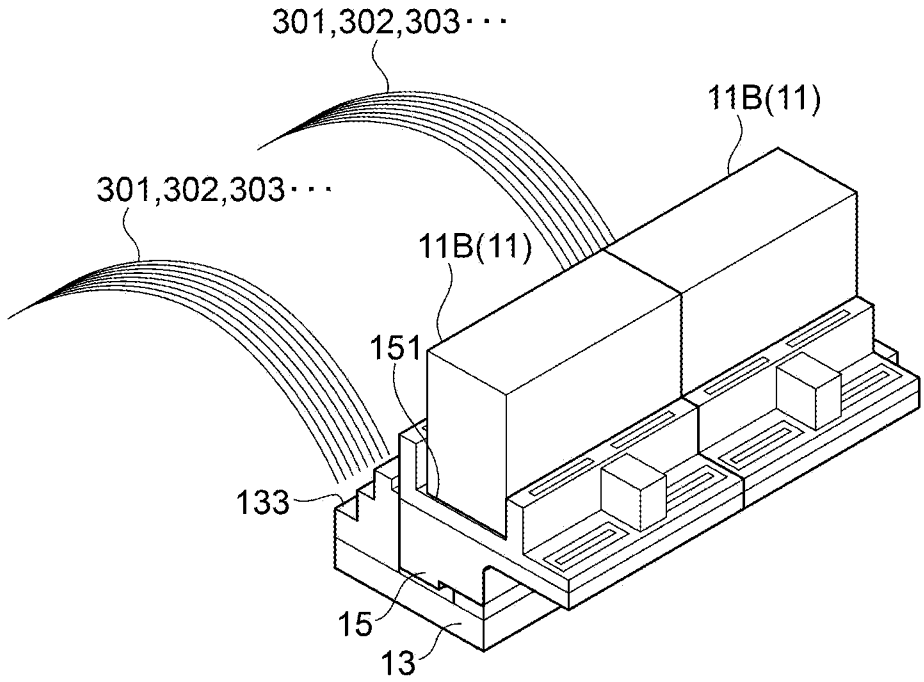
FIG. 7 is a perspective view schematically showing the terminal base adapter shown in FIG. 5 and the new control IO module mounted on the terminal base adapter.

FIG. 6 is a perspective view schematically showing the terminal base adapter 15 shown in FIG. 5 and the new control IO module 11B to be mounted on the terminal base adapter 15, and FIG. 7 is a perspective view schematically showing the terminal base adapter 15 shown in FIG. 5 and the new control IO module 11B mounted on the terminal base adapter 15.

As shown in FIG. 6, the terminal base adapter 15 is provided with a module mount section 151 on which the new control IO module 11B is mounted. The module mount section 151 of the terminal base adapter 15 is provided with an electrical connector 152 on which an electrical connector (not shown) disposed in the new control IO module 11B is mounted, and as shown in FIG. 7, if the new control IO module 11B is mounted on the terminal base adapter 15, the electrical connector of the new control IO module 11B is mounted on the electrical connector 152 disposed on the module mount section 151 of the terminal base adapter 15. Consequently, the IO signal converted by the terminal base adapter 15 is input to the new control TO module 11B, and the IO signal output from the new control IO module 11B is input to the terminal base adapter 15.

With the above-described plant control device 1, the existing control IO module 11A can be renewed with the new control IO module 11B even without disconnecting, from the terminal base 13, the wiring 301, 302, 303 . . . connected to each of the multiple devices 310, 320, 330 . . . installed in the plant 100. Further, since the wiring 301, 302, 303 . . . connected to each of the multiple devices 310, 320, 330 . . . installed in the plant 100 is connected to the terminal base 13 and the terminal base adapter 15 is mounted on the terminal base 13, the terminal base 13 receives the weight of the wiring 301, 302, 303 . . . and the new control TO module 11B mounted on the terminal base adapter 15 functions stably.

The above-described terminal base adapter 15 is paired with the new control TO module 11B. That is, the terminal base adapter 15 differs for each classification of the new control IO module 11B, and the terminal base adapter 15 is provided for each classification of the new control IO module 11B. For example, if the new control IO module 11B is classified into the control IO module capable of analog input, the control IO module capable of analog output, the control IO module capable of digital input, and the control IO module capable of digital output, the terminal base adapter 15 is also classified into a terminal base adapter capable of analog input, a terminal base adapter capable of analog output, a terminal base adapter capable of digital input, and a terminal base adapter capable of digital output, and the classification of the terminal base adapter 15 is determined by the classification of the new control IO module 11B.

With such configuration, since the new control IO module 11B functions in pairs with the terminal base adapter 15, the new control IO module 11B and the terminal base adapter are replaced (renewed) as a pair (set).

For example, if the classification of the control IO module 11B is the control IO module capable of analog input, the terminal base adapter 15 is the terminal base adapter capable of analog input, which is paired with the control IO module capable of analog input. With this combination, the analog input (JO signal) input from the terminal base 13 to the terminal base adapter 15 is converted by the predetermined logic and input to the control IO module 11B.

Further, for example, if an IO circuit structure inside the existing control IO module 11A and an IO circuit structure inside the new control IO module 11B are different, the IO circuit structure of the terminal base adapter 15 is adapted to the IO circuit structure of the existing control IO module 11A, thereby renewing the existing control IO module 11A with the new control IO module 11B without confirming the adequacy of component mounting and signal connection on site.

Further, for example, in the five-channel existing control IO module 11A and the four-channel new control IO module 11B, signal connection relationships of the wirings 301, 302, 303 . . . connected to the control IO module 11A (11B) and the terminal base 13 are different. In this case, by renewing the existing the control IO module 11A with the new control IO module 11B together with the terminal base adapter 15, it is possible to convert, by the predetermined logic, the signal connection relationship into the signal connection relationship suitable for the four-channel new control IO module 11B.

The above-described terminal base adapter 15 includes an erroneous mounting prevention means 153 for allowing the paired new control IO module 11B to be mounted. As shown in FIG. 6, the erroneous mounting prevention means 153 is composed of, for example, a socket 154 disposed on the module mount section 151 of the terminal base adapter 15, an erroneous insertion prevention key 155 mounted in a slot of the socket 154, and a plug (not shown) disposed on the new control IO module 11B, and prevents mounting of anything other than the new control IO module 11B paired with the terminal base adapter 15 while allowing the new control module 11B paired with the terminal base adapter 15 to be mounted.

With such configuration, since the new control IO module 11B paired with the terminal base adapter 15 is allowed to be mounted on the terminal base adapter 15 and the mounting of anything other than the new control IO module 11B paired with the terminal base adapter 15 is prevented, it is possible to prevent mounting (erroneous mounting) of anything other than the new control IO module 11B paired with the terminal base adapter 15 on the terminal base adapter 15.

The above-described terminal base adapter 15 includes a fall prevention means (not shown) for preventing the new control IO module 11B from falling. The fall prevention means is formed of, for example, a lock mechanism built in the terminal base adapter 15 and is configured to lock the new control IO module 11B by engaging with a protrusion disposed on the new control IO module 11B when the new control IO module 11B is mounted on the terminal base adapter 15, for example.

With such configuration, it is possible to prevent the new control IO module 11B from falling from the terminal base adapter 15.

Figure 8:
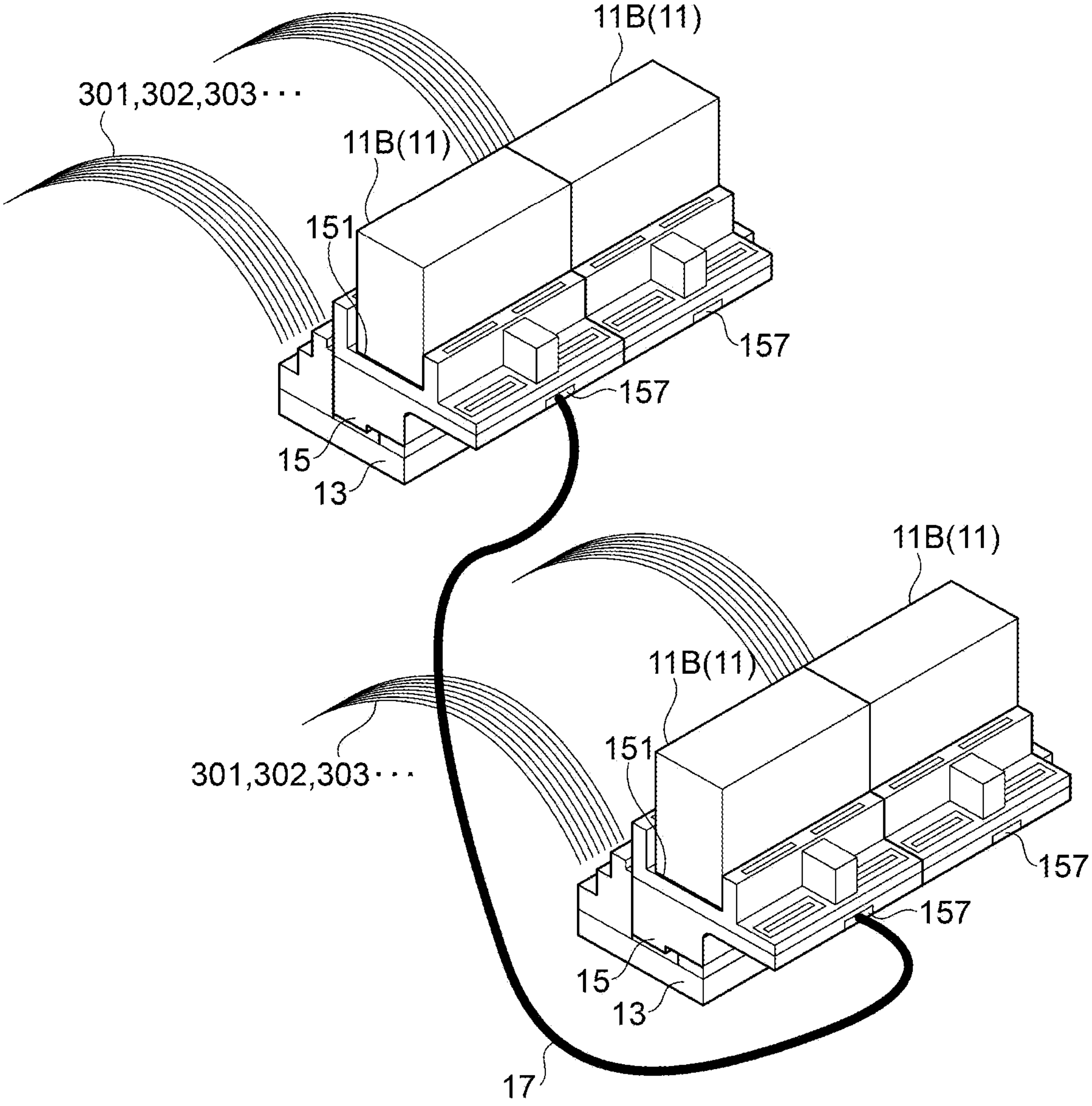
FIG. 8 is a view showing one terminal base adapter and another terminal base adapter connected thereto by a duplex cable.

FIG. 8 is a view showing one terminal base adapter 15 and another terminal base adapter 15 connected thereto by a duplex cable 17.

As shown in FIG. 8, the above-described terminal base adapter 15 further includes a signal terminal 157 for enabling input/output of a redundant signal. The signal terminal 157 can be mounted with one end of the duplex cable 17.

With such configuration, since the one end of the duplex cable 17 is connected to the signal terminal 157 of the one terminal base adapter 15 and another end of the duplex cable 17 is connected to the signal terminal 157 of the another terminal base adapter 15, the redundant signal can be input/output between the new control IO module 11B mounted on the one terminal base 13 and the new control IO module 11B mounted on the another terminal base 13.

Figure 9:
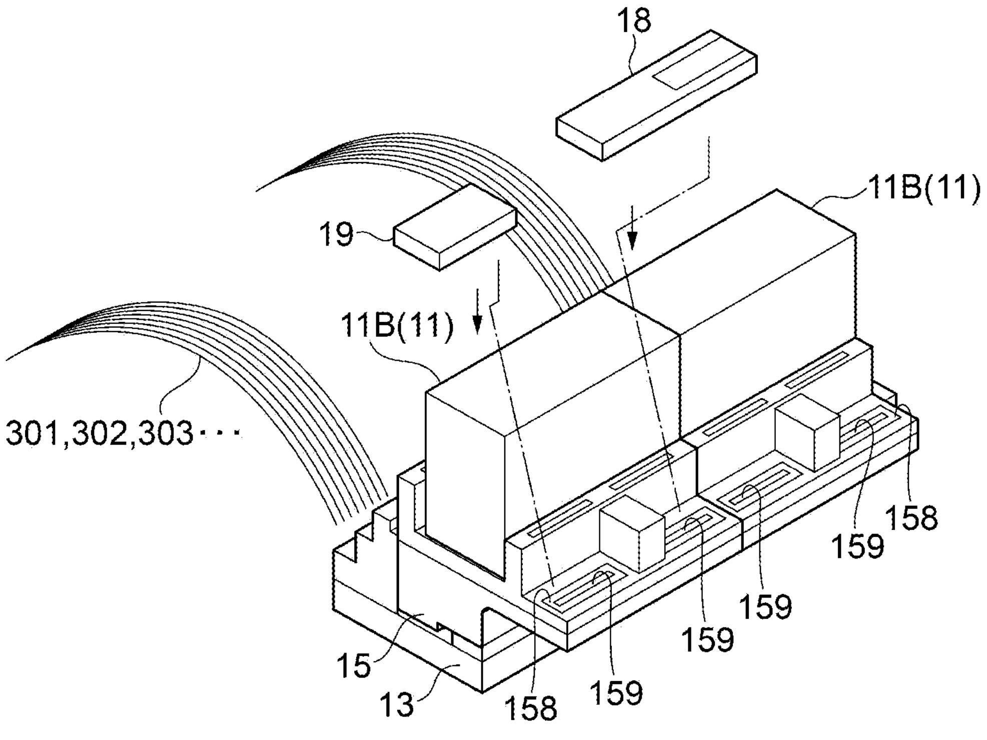
FIG. 9 is a perspective view schematically showing the terminal base adapter shown in FIG. 5, and a communication connection component and a protective cover to be mounted on the terminal base adapter.
Figure 10:
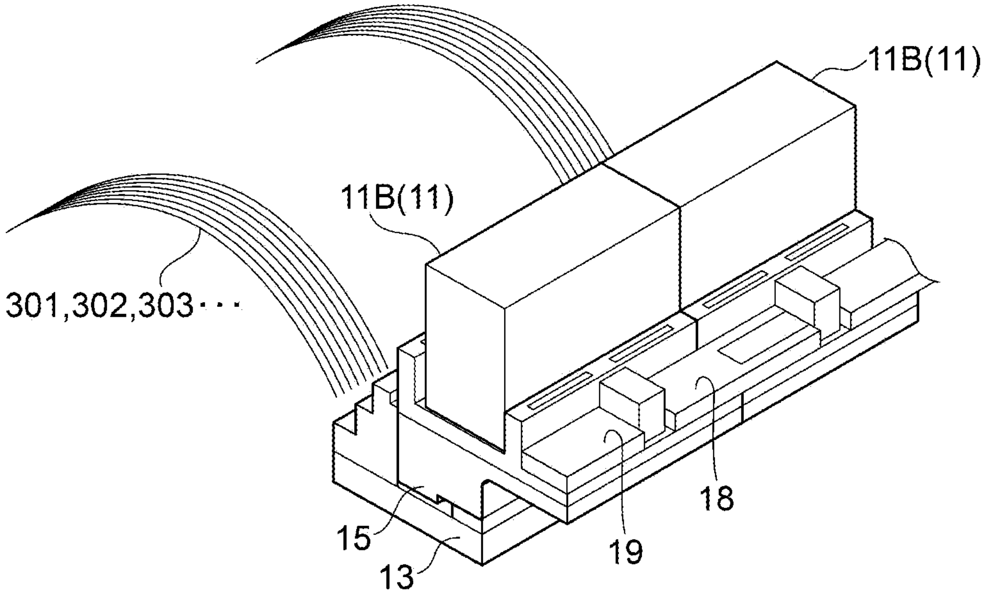
FIG. 10 is a perspective view schematically showing the terminal base adapter shown in FIG. 5, and the communication connection component and the protective cover mounted on the terminal base adapter.

FIG. 9 is a perspective view schematically showing the terminal base adapter 15 shown in FIG. 5, and a communication connection component 18 and a protective cover 19 to be mounted on the terminal base adapter 15, and FIG. 10 is a perspective view schematically showing the terminal base adapter 15 shown in FIG. 5, and the communication connection component 18 and the protective cover 19 mounted on the terminal base adapter 15.

As shown in FIG. 9, the above-described terminal base adapter 15 is provided with a component mount section 158 on which the communication connection component 18 is mounted. The component mount section 158 of the terminal base adapter 15 is provided with a communication terminal 159 to which a communication terminal (not shown) disposed in the communication connection component 18 is connected, and as shown in FIG. 10, if the communication connection component 18 is mounted on the terminal base adapter 15, the communication terminal of the communication connection component 18 is mounted on the communication terminal 159 disposed on the component mount section 158 of the terminal base adapter 15.

With such configuration, since the communication connection component 18 is mounted on the component mount section 158 of the one terminal base adapter 15, communication is possible with the another terminal base adapter 15 where the communication connection component 18 is connected to the component mount section 158.

In the examples shown in FIGS. 9 and 10, the component mount sections 158 are disposed on both sides in an extension direction of the terminal base 13 mounted with the terminal base adapter 15, and one communication connection component 18 is mounted across the component mount sections 158 respectively disposed on the two terminal base adapters 15 mounted side by side in the extension direction of the terminal base 13. Whereby, communication is possible between the two terminal base adapters 15 mounted side by side in the extension direction of the terminal base 13.

A slight dimensional error occurs in a gap between the two terminal base adapters depending on a mounting state, and thus a floating connector having a degree of freedom that can allow such dimensional error can be used as the communication connection component 18.

That is, the communication terminal 159 disposed on the terminal base adapter 15 described above is formed of a floating connector capable of absorbing an error in a direction orthogonal to a mounting direction of the communication terminal 159.

With such configuration, a mounting error of the communication connection component 18 with respect to the terminal base adapters 15 is allowed, and the communication terminal of the communication connection component 18 is mounted on the communication terminals 159 disposed on the component mount sections 158 of the terminal base adapters 15.

In the examples shown in FIGS. 9 and 10, even if the gap (mounting error) occurs between the two terminal base adapters 15, each of the two communication terminals disposed in the communication connection component 18 is mounted on the communication terminal 159 disposed in the component mount section 158 of each of the two terminal base adapters 15.

As shown in FIGS. 9 and 10, the component mount section 158 of the terminal base adapter 15 described above can be mounted with the protective cover 19 for protecting the communication terminal 159.

With such configuration, the protective cover 19 is mounted if the communication connection component 18 is not mounted on the component mount section 158 of the terminal base adapter 15, making it possible to protect the communication terminal 159 disposed in the component mount section 158 of the terminal base adapter 15.

Figure 11:
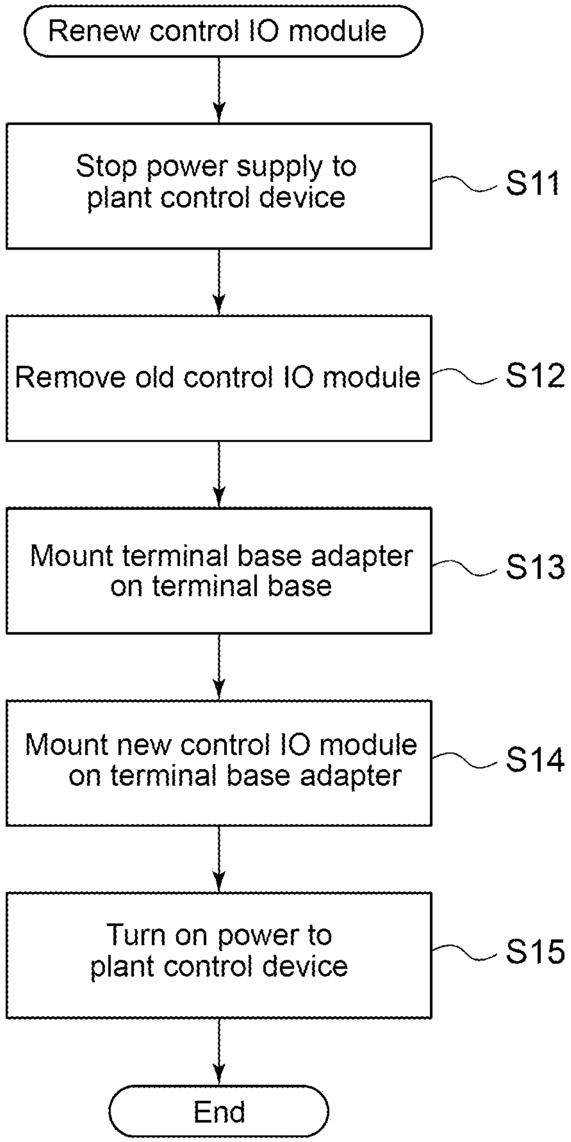
FIG. 11 is a flowchart for describing a method for renewing a control IO module in a plant control device.

FIG. 11 is a flowchart for describing a method for renewing the control IO module 11 in the plant control device 1.

As shown in FIG. 11, the method for renewing the control IO module 11 in the plant control device 1 described above is a method for renewing the existing control IO module 11A with the renewal new control IO module 11B.

The method for renewing the control IO module 11 includes a step (step S11) of stopping power supply to the plant control device 1, a step (step S12) of removing the existing control IO module 11A from the terminal base 13, a step (step S13) of mounting, on the terminal base 13, the terminal base adapter 15 in place of the existing control IO module 11A, a step (step S14) of mounting the new control IO module 11B on the terminal base adapter 15, and a step (step S15) of turning on power to the plant control device 1.

With the method for renewing the control IO module 11 in the plant control device 1 described above, the existing control IO module 11A can be renewed with the new control IO module 11B even without disconnecting, from the terminal base 13, the wiring 301, 302, 303 . . . connected to each of the multiple devices 310, 320, 330 . . . installed in the plant 100. That is, the existing terminal base connected to the wiring 301, 302, 303 . . . remains in the state of being attached to the base body, thereby renewing the existing control IO module 11A with the new control IO module 11B. Therefore, work such as disconnection of the IO cable, removal of the existing terminal base, installation of a new terminal base on the base body, wire connection of the IO cable to the new terminal base, or checking of the IO signal does not occur, making it possible to shorten a construction period. Further, since the wiring 301, 302, 303 . . . connected to each of the multiple devices 310, 320, 330 . . . installed in the plant 100 is connected to the terminal base 13 and the terminal base adapter 15 is mounted on the terminal base 13, the terminal base 13 receives the weight of the wiring 301, 302, 303 . . . and the new control IO module 11B mounted on the terminal base adapter 15 functions stably.

Figure 12:
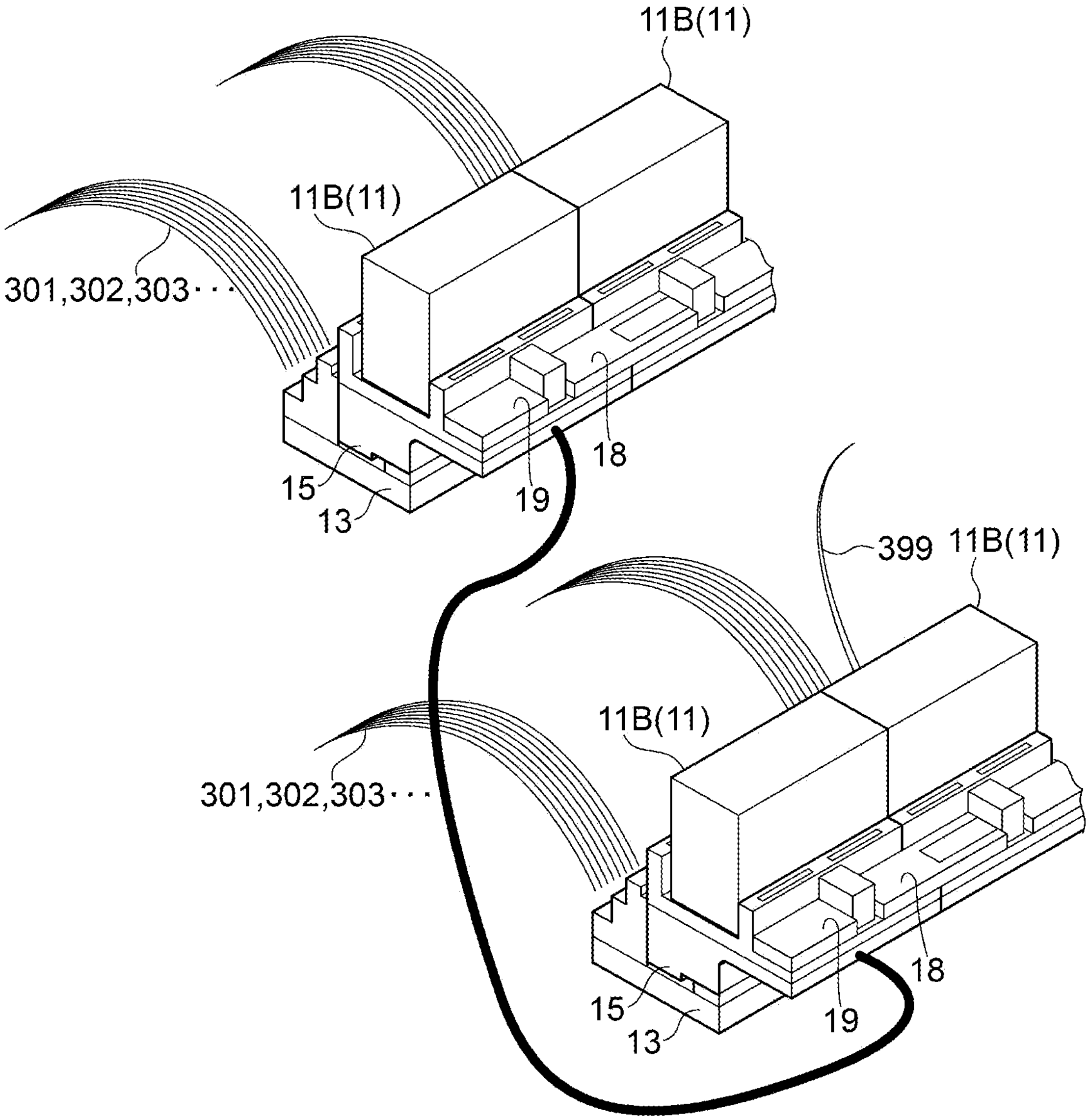
FIG. 12 is a perspective view schematically showing a control IO module newly connected to the terminal base mounted with the one terminal base adapter shown in FIG. 8.

FIG. 12 is a perspective view schematically showing the control IO module 11B where a wiring 399 is newly connected to the terminal base 13 mounted with the one terminal base adapter 15 shown in FIG. 8.

As shown in FIG. 12, when the existing control IO module 11A is renewed with the new control IO module 11B, the wiring 399 connected to the device installed in the plant 100 may be newly connected (additionally connected). If the wiring 399 connected to the device installed in the plant 100 is newly connected, the wiring 399 is connected to, for example, an empty terminal of the terminal base 13.

If the wiring 399 is thus newly connected, the method for renewing the control IO module 11 described above includes a step of checking the wire connection between the device installed in the plant 100 and the terminal base 13, before the step of turning on power to the plant control device 1.

The present invention is not limited to the above-described embodiments, and also includes an embodiment obtained by modifying the above-described embodiments and an embodiment obtained by combining these embodiments as appropriate.

The contents described in the above embodiments would be understood as follows, for instance.

A plant control device (1) according an aspect [1], includes: a terminal base (13) where a wiring (301, 302, 303 . . . ) is connected which is connected to each of multiple devices (310, 320, 330 . . . ) installed in a plant (100); a control IO module (11B) where an IO signal is input or the IO signal is output; and a terminal base adapter (15) disposed between the control IO module (11B) and the terminal base (13), the terminal base adapter (15) being configured to convert, by a predetermined logic, an IO signal input from at least one of the multiple devices (310, 320, 330 . . . ) or the IO signal input from the control IO module (11B). The terminal base adapter (15) is mountable on the terminal base (13) and includes a second electrical connector which is mounted with a first electrical connector disposed on the control IO module (11B).

With such configuration, since the wiring (301, 302, 303 . . . ) connected to each of the multiple devices (310, 320, 330 . . . ) installed in the plant (100) is connected to the terminal base (13) and the terminal base adapter (15) is mounted on the terminal base (13), the terminal base (13) receives the weight of the wiring (301, 302, 303 . . . ) and the control IO module (11B) mounted on the terminal base adapter (15) functions stably.

[2] A plant control device (1) according to another aspect is the plant control device (1) as defined in [1], wherein the terminal base adapter (15) is paired with the control IO module (11B).

With such configuration, since the control IO module (11B) functions in pairs with the terminal base adapter (15), the control IO module (11B) and the terminal base adapter (15) are replaced (renewed) as a pair (set).

[3] A plant control device (1) according to another aspect is the plant control device (1) as defined in [2], wherein the terminal base adapter (15) includes an erroneous mounting prevention means (153) for allowing the paired control IO module (11B) to be mounted.

With such configuration, since the control IO module (11B) paired with the terminal base adapter (15) is allowed to be mounted on the terminal base adapter (15) and the mounting of anything other than the control IO module (11B) paired with the terminal base adapter (15) is prevented, it is possible to prevent mounting (erroneous mounting) of anything other than the control IO module (11B) paired with the terminal base adapter (15) on the terminal base adapter (15).

[4] A plant control device (1) according to another aspect is the plant control device (1) as defined in any one of [1] to [3], wherein the terminal base adapter (15) includes a fall prevention means for preventing the control IO module (11B) from falling.

With such configuration, it is possible to prevent the control IO module (11B) from falling from the terminal base adapter (15).

[5] A plant control device (1) according to another aspect is the plant control device (1) as defined in any one of [1] to [4], wherein the terminal base adapter (15) further includes a signal terminal (157) for enabling input/output of a redundant signal.

With such configuration, since the one end of the duplex cable (17) is connected to the signal terminal (157) of the one terminal base adapter (15) and another end of the duplex cable (17) is connected to the signal terminal (157) of the another terminal base adapter (15), the redundant signal can be input/output between the control IO module (11B) mounted on the one terminal base (13) and the control IO module (11B) mounted on the another terminal base (13).

[6] A plant control device (1) according to another aspect is the plant control device (1) as defined in any one of [1] to [5], wherein the terminal base adapter (15) further includes a communication terminal (159) for enabling mounting of a communication connection component (18).

With such configuration, since the communication connection component (18) is mounted on the communication terminal (159) of the one terminal base adapter (15), communication is possible with the another terminal base adapter (15) where the communication connection component (18) is mounted on the communication terminal (159).

[7] A plant control device (1) according to another aspect is the plant control device (1) as defined in [6], wherein the communication terminal (159) is formed of a floating connector capable of absorbing an error in a direction orthogonal to a mounting direction of the communication terminal.

With such configuration, a mounting error of the communication connection component (18) with respect to the terminal base adapter (15) is allowed, and the communication terminal of the communication connection component (18) is mounted on the communication terminal (159) of the terminal base adapter (15).

[8] A method for renewing a control IO module (11) in a plant control device (1) according to [8], includes: a step of removing an existing control IO module (11A) from a terminal base (13) where a wiring (301, 302, 303 . . . ) is connected which is connected to each of multiple devices (310, 320, 330 . . . ) installed in a plant; a step of mounting, on the terminal base (13), a terminal base adapter (15) in place of the existing control IO module (11A); and a step of mounting a new control IO module (11B) on the terminal base adapter (15).

With such method, since the wiring (301, 302, 303 . . . ) connected to each of the multiple devices (310, 320, 330 . . . ) installed in the plant (100) is connected to the terminal base (13) and the terminal base adapter (15) is mounted on the terminal base (13), the terminal base (13) receives the weight of the wiring (301, 302, 303 . . . ) and the new control IO module (11B) mounted on the terminal base adapter (15) functions stably. Further, since the existing control TO module (11A) can be renewed with the new control IO module (11B) without disconnecting the wiring connected to each of the multiple devices from the existing terminal base (13), it is possible to suppress the possibility of incorrect connection associated with reconnection work and to shorten the construction period of the renewal work. Furthermore, since the renewal work for the control IO module is performed by using the existing terminal base (13) as it is, it is possible to minimize the scope of work such as structural change of a control panel.

REFERENCE SIGNS LIST

1 Plant control device
11 Control IO module
11A Existing control IO module
11B New control IO module
13 Terminal base
131 Terminal section
132 Mount section
133 Electrical connector
14 DIN rail
15 Terminal base adapter
151 Module mount section
152 Electrical connector
153 Erroneous mounting prevention means
154 Socket
155 Erroneous insertion prevention key
157 Signal terminal
158 Component mount section
159 Communication terminal
17 Duplex cable
18 Communication connection component
19 Protective cover
21 Network
31 High-speed arithmetic controller
100 Plant
200 Control system for plant
301, 302, 303 . . . Wiring
310, 320, 330 . . . Device installed in plant
310 Valve
320 Transmitter
330 Sensor
399 Wiring
400 Operation terminal

The invention claimed is:

1. A plant control device, comprising:

a terminal base where a wiring is connected which is connected to each of multiple devices installed in a plant;

a control IO module where an IO signal is input or the IO signal is output; and a terminal base adapter disposed between the control IO module and the terminal base, the terminal base adapter being configured to convert, by a predetermined logic, an IO signal input from at least one of the multiple devices or the IO signal input from the control IO module, wherein the terminal base adapter is mountable on the terminal base and includes a second electrical connector which is mounted with a first electrical connector disposed on the control IO module, wherein the terminal base adapter is paired with the control IO module, and wherein the terminal base adapter includes an erroneous mounting prevention means for allowing the paired control IO module to be mounted.

2. The plant control device according to claim 1, wherein the terminal base adapter further includes a signal terminal for enabling input/output of a redundant signal.

3. The plant control device according to claim 1, wherein the terminal base adapter further includes a communication terminal for enabling mounting of a communication connection component.

4. A plant control device, comprising:

a terminal base where a wiring is connected which is connected to each of multiple devices installed in a plant;

a control IO module where an IO signal is input or the IO signal is output; and a terminal base adapter disposed between the control IO module and the terminal base, the terminal base adapter being configured to convert, by a predetermined logic, an IO signal input from at least one of the multiple devices or the IO signal input from the control IO module, wherein the terminal base adapter is mountable on the terminal base and includes a second electrical connector which is mounted with a first electrical connector disposed on the control IO module, and wherein the terminal base adapter includes a fall prevention means for preventing the control IO module from falling.

5. A plant control device, comprising:

a terminal base where a wiring is connected which is connected to each of multiple devices installed in a plant;

a control IO module where an IO signal is input or the IO signal is output; and a terminal base adapter disposed between the control IO module and the terminal base, the terminal base adapter being configured to convert, by a predetermined logic, an IO signal input from at least one of the multiple devices or the IO signal input from the control IO module, wherein the terminal base adapter is mountable on the terminal base and includes a second electrical connector which is mounted with a first electrical connector disposed on the control IO module, wherein the terminal base adapter further includes a communication terminal for enabling mounting of a communication connection component, and wherein the communication terminal is formed of a floating connector capable of absorbing an error in a direction orthogonal to a mounting direction of the communication terminal.

6. A method for renewing a control IO module in a plant control device, comprising:

a step of removing an existing control IO module from a terminal base where a wiring is connected which is connected to each of multiple devices installed in a plant;

a step of mounting, on the terminal base, a terminal base adapter in place of the existing control IO module; and a step of mounting a new control IO module on the terminal base adapter.

* * * * *